(12) United States Patent
Eskew et al.

(10) Patent No.: US 11,268,540 B2
(45) Date of Patent: Mar. 8, 2022

(54) DAMPING COMPONENT FOR A FAN GUARD

(71) Applicant: Johnson Controls Technology Company, Auburn Hills, MI (US)

(72) Inventors: Robert L. Eskew, Kingman, KS (US); Wayne E. Romero, Wichita, KS (US)

(73) Assignee: Johnson Controls Technology Company, Auburn Hills, MI (US)

( * ) Notice: Subject to any disclaimer, the term of this patent is extended or adjusted under 35 U.S.C. 154(b) by 962 days.

(21) Appl. No.: 15/933,157

(22) Filed: Mar. 22, 2018

(65) Prior Publication Data
US 2019/0264711 A1 Aug. 29, 2019

Related U.S. Application Data

(60) Provisional application No. 62/636,033, filed on Feb. 27, 2018.

(51) Int. Cl.
| *F24F 1/40* | (2011.01) |
| *F24F 13/24* | (2006.01) |
| *F04D 29/66* | (2006.01) |
| *F04D 29/70* | (2006.01) |
| *F04D 25/08* | (2006.01) |
| *F04D 25/06* | (2006.01) |

(Continued)

(52) U.S. Cl.
CPC ......... *F04D 29/668* (2013.01); *F04D 19/002* (2013.01); *F04D 25/06* (2013.01); *F04D 25/08* (2013.01); *F04D 29/703* (2013.01); *F16B 2/22* (2013.01); *F24F 1/40* (2013.01); *F24F 13/24* (2013.01)

(58) Field of Classification Search
CPC ...... F04D 29/668; F04D 29/703; F04D 29/60; F16B 2/20; F16B 2/22; Y10T 403/606; F24F 13/20; F24F 13/24; F24F 1/40; F24F 1/56
See application file for complete search history.

(56) References Cited

U.S. PATENT DOCUMENTS

| 5,073,088 A | * | 12/1991 | Peng | F04D 29/703 416/247 R |
| 5,695,206 A | * | 12/1997 | Belka | B62J 15/02 280/152.1 |
| 5,904,744 A | | 5/1999 | Kagan | |

(Continued)

FOREIGN PATENT DOCUMENTS

| DE | 299 00 923 | * | 8/2000 | ............ H02K 5/24 |
| DE | 101 11 397 | * | 4/2010 | ............ F04D 29/70 |

(Continued)

OTHER PUBLICATIONS

Translation of DE 20 20174 104 303: worldwide.espacenet.com. Jul. 30, 2021.*

*Primary Examiner* — Michael P Ferguson
(74) *Attorney, Agent, or Firm* — Fletcher Yoder, P.C.

(57) ABSTRACT

The present disclosure is directed to a heating, ventilation, and air conditioning (HVAC) system that includes a housing configured to receive a motor of the HVAC system, a fan guard coupled to a surface of the housing, and a damping device disposed between the fan guard and the surface of the housing, where the damping device is configured to absorb vibrational energy generated by the HVAC system.

9 Claims, 10 Drawing Sheets

(51) Int. Cl.
*F16B 2/22* (2006.01)
*F04D 19/00* (2006.01)

(56) References Cited

U.S. PATENT DOCUMENTS

| | | | |
|---|---|---|---|
| 6,036,444 | A | 3/2000 | Barney et al. |
| 6,439,852 | B1 | 8/2002 | Andriotis et al. |
| 8,192,179 | B2 * | 6/2012 | Miller .................. F04D 29/703 417/423.14 |
| 8,876,092 | B2 * | 11/2014 | Wojcieson ............... H02K 5/24 267/136 |
| 9,746,003 | B2 | 8/2017 | Frank et al. |
| 9,758,349 | B2 | 9/2017 | Mandy et al. |
| 2005/0118022 | A1 | 6/2005 | Fu |
| 2007/0071618 | A1 | 3/2007 | Rhoads |
| 2008/0131274 | A1 * | 6/2008 | Kim ..................... F24F 1/0007 415/204 |
| 2009/0162188 | A1 | 6/2009 | Milks |
| 2012/0183390 | A1 | 7/2012 | Pan |

FOREIGN PATENT DOCUMENTS

| | | | | |
|---|---|---|---|---|
| DE | 20 2017 104 303 | * | 10/2017 | ............. F04D 29/70 |
| WO | 2017211474 A1 | | 12/2017 | |

* cited by examiner

DAMPING COMPONENT FOR A FAN GUARD

CROSS REFERENCE TO RELATED APPLICATIONS

This application claims priority from and the benefit of U.S. Provisional Application Ser. No. 62/636,033, entitled "DAMPING COMPONENT FOR A FAN GUARD," filed Feb. 27, 2018, which is hereby incorporated by reference in its entirety for all purposes.

BACKGROUND

The present disclosure relates generally to environmental control systems, and more particularly, to a vibration damping component for a fan guard.

Environmental control systems are utilized in residential, commercial, and industrial environments to control environmental properties, such as temperature and humidity, for occupants of the respective environments. The environmental control system may control the environmental properties through control of an airflow delivered to the environment. In some cases, heating, ventilation, and air conditioning (HVAC) systems include a fan guard, motor mount, and/or fan grill that is disposed over a fan that directs air across a heat exchanger of the HVAC system. The fan guard is typically coupled to a housing of the HVAC system that receives the fan, the heat exchanger, a compressor, a motor, and/or other components of the HVAC system. Vibrational energy generated by components that are included in the housing may be transferred to the fan guard, which then transfers the vibrational energy to the housing. Vibrations between the fan guard and the housing generate noise, which may be unpleasant for occupants of a residence or commercial structure where the HVAC system is located.

SUMMARY

In one embodiment of the present disclosure, a heating, ventilation, and air conditioning (HVAC) system includes a housing configured to receive a motor of the HVAC system, a fan guard coupled to a surface of the housing, and a damping device disposed between the fan guard and the surface of the housing, where the damping device is configured to absorb vibrational energy generated by the HVAC system.

In another embodiment of the present disclosure, a damping device for a heating, ventilation, and air conditioning (HVAC) system includes a clip configured to couple the damping device to a fan guard of the HVAC system, a slot configured to align with an opening of the fan guard of the HVAC system, where the slot includes a length greater than a width of the opening, and where the slot of the damping device is configured to receive a fastener configured to extend through the opening and the slot to couple the fan guard to a housing of the HVAC system.

In a further embodiment of the present disclosure, a heating, ventilation, and air conditioning (HVAC) system includes a housing, a fan disposed within the housing, a motor coupled to the fan and disposed within the housing, where the motor is configured to drive rotation of the fan, a fan guard coupled to a surface of the housing, and a damping device disposed between the fan guard and the surface of the housing, wherein the damping device is configured to absorb vibrational energy caused by the motor.

Other features and advantages of the present application will be apparent from the following, more detailed description of the embodiments, taken in conjunction with the accompanying drawings which illustrate, by way of example, the principles of the application.

DETAILED DESCRIPTION

The present disclosure is directed to a damping device or component for absorbing vibrational energy that may generally be transferred between a fan guard of a heating, ventilation, and air conditioning (HVAC) system to a housing of the HVAC system. As used herein, the fan guard may also refer to a motor mount, a fan grill, or any other suitable component that is disposed over an opening of the housing of the HVAC system. As discussed above, the fan guard is coupled to the housing of the HVAC system to cover a fan and/or other components that may be disposed within the housing. Typically, both the fan guard and the housing of the HVAC system include a metallic material, which may increase or reverberate noise caused by the vibrations between the fan guard and the housing.

Embodiments of the present disclosure relate to a damping component that is disposed between the fan guard and the housing of the HVAC system to absorb vibrational energy transferred between the fan guard and the housing, thereby reducing noise that the HVAC system produces. Specifically, in some embodiments, the damping component may include a clip that is configured to secure the damping component to a portion of the fan guard before the fan guard is positioned onto a surface of the housing of the HVAC system. As such, the clip of the damping component may simply be disposed over the portion of the fan guard during assembly of the fan guard onto the housing of the HVAC system. In other embodiments, the damping component includes an adhesive that enables the damping component to be positioned over openings of the housing that receive fasteners coupling the fan guard to the housing. In still further embodiments, the damping components include a slot that includes a length that is greater than a width of an opening of the fan guard and/or an opening of the housing. As such, the damping components provide flexibility for variances in sizes and/or shapes of the fan guard and the housing that may be due to engineering or manufacturing tolerances. In any case, the damping components absorb vibrational energy that may otherwise be transferred between the fan guard and the housing, and thus, reduce noise that is produced by the HVAC system.

Figure 1:
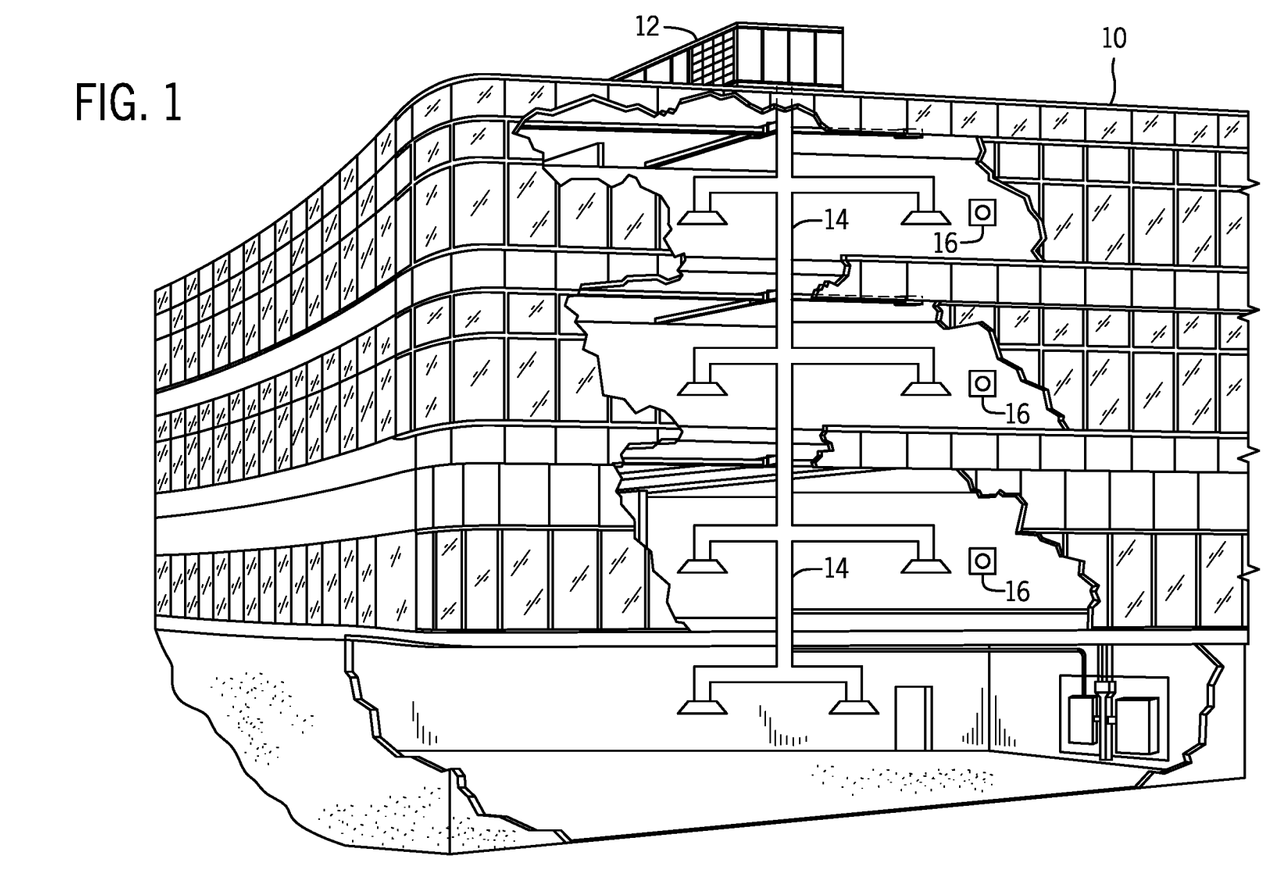
FIG. 1 is a schematic of an environmental control for building environmental management that may employ an HVAC unit, in accordance with an aspect of the present disclosure.

Turning now to the drawings, FIG. 1 illustrates a heating, ventilation, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single packaged unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
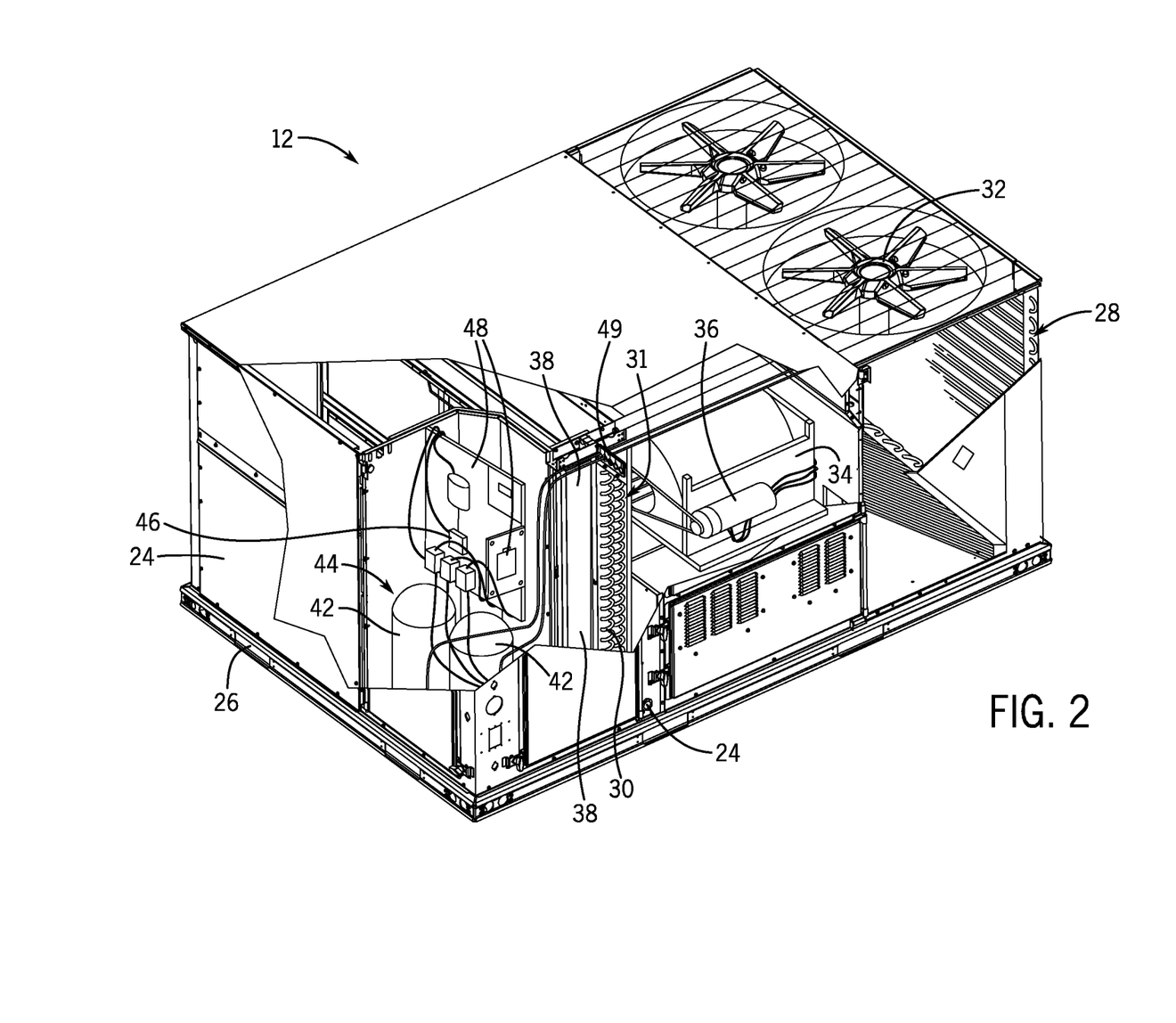
FIG. 2 is a perspective view of an embodiment of an HVAC unit that may be used in the environmental control system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
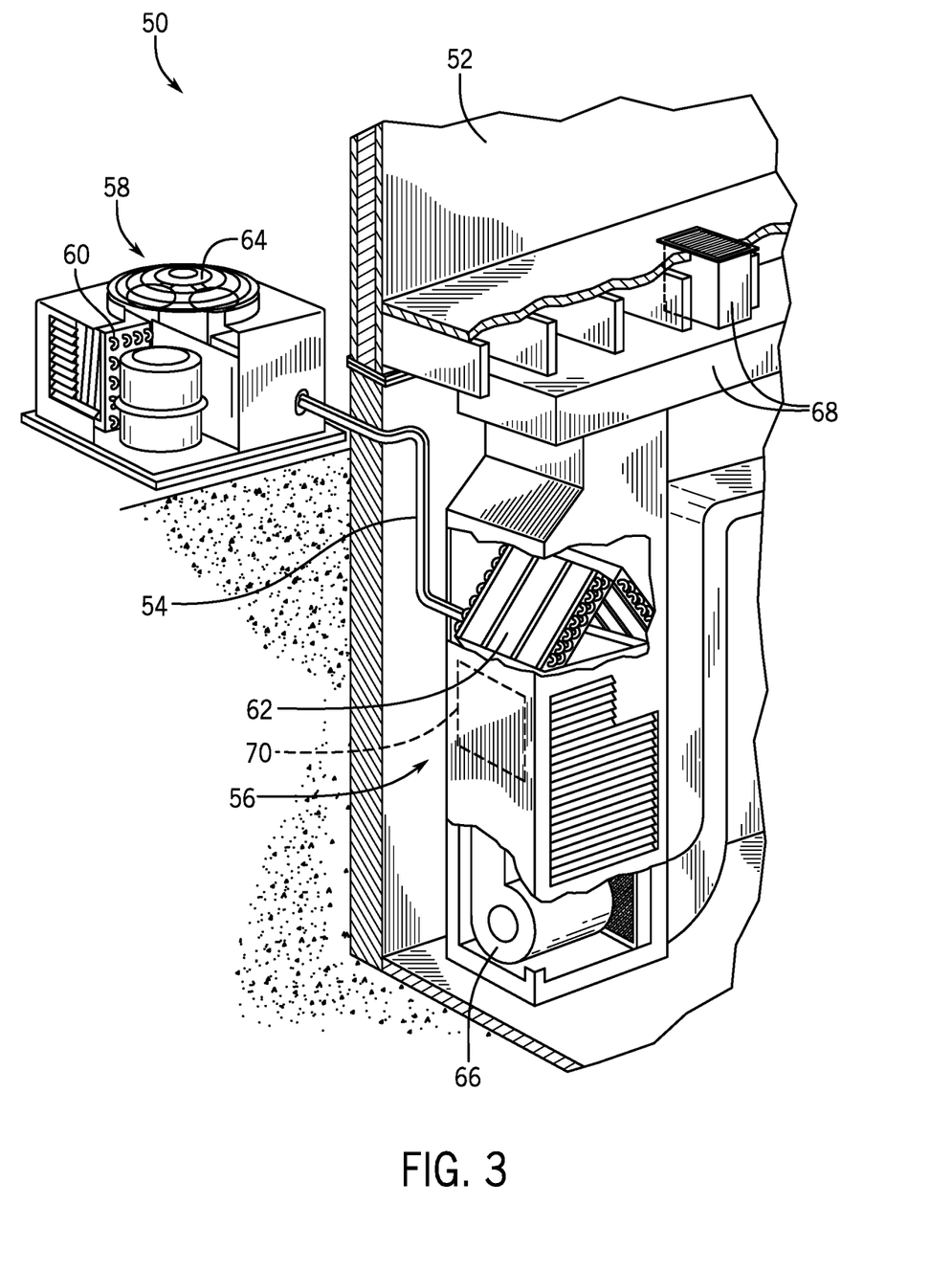
FIG. 3 is a schematic of a residential heating and cooling system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
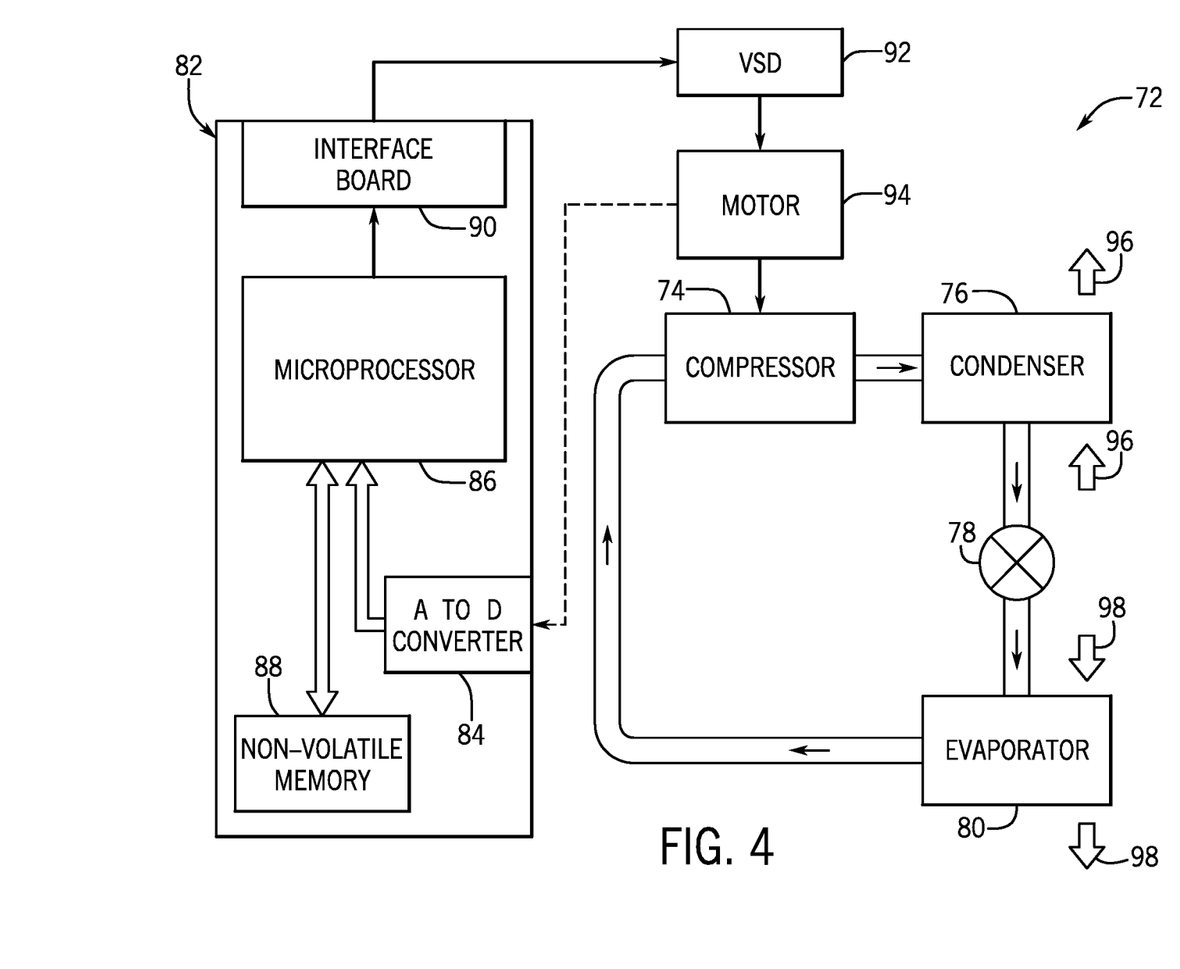
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As set forth above, embodiments of the present disclosure are directed to a damping device 100 configured to reduce vibrational energy transferred between a fan guard of the HVAC unit 12 and/or the residential heating or cooling system 50, referred to collectively as an HVAC system, and a housing of the HVAC system. Typically, the fan guard and the housing include metallic materials, such that vibrations between the fan guard and the housing generate noise, such as acoustic noise, in addition to noise emitted from components of the HVAC system during operation. As such, the damping device 100 is disposed between a portion of the fan guard and a surface of the housing to absorb vibrational energy that would otherwise be transferred between the fan guard and the housing. As such, the damping device 100 reduces noise produced by the HVAC system.

Figure 5:
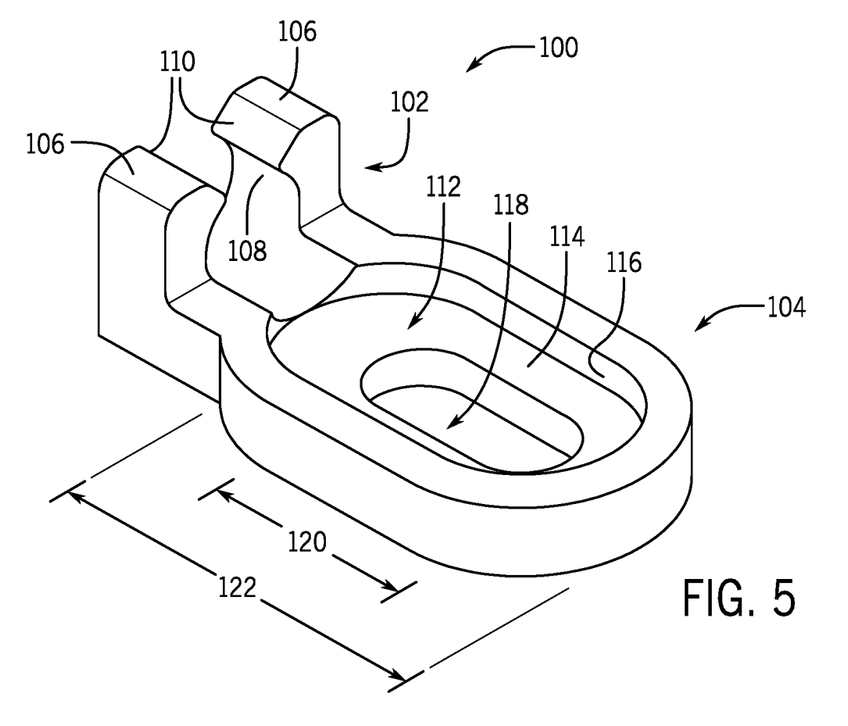
FIG. 5 is a perspective view of a damping component that may be positioned between a fan guard and a housing of the HVAC unit of FIG. 1 and/or the residential heating and cooling system of FIG. 3, in accordance with an aspect of the present disclosure.
Figure 6:
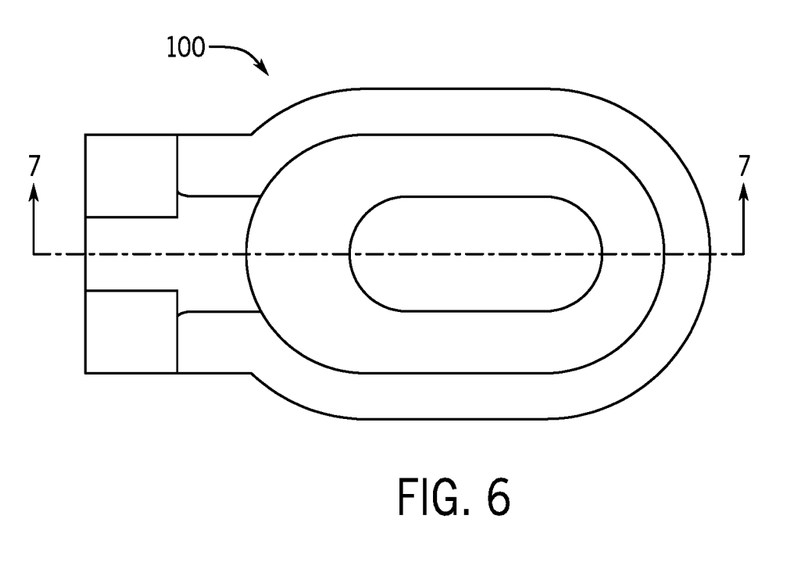
FIG. 6 is a plan view of an embodiment of the damping component of FIG. 5, in accordance with an aspect of the present disclosure.
Figure 7:
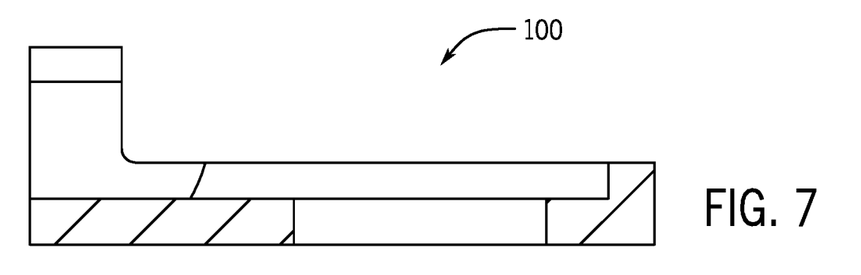
FIG. 7 is cross section of an embodiment of the damping component of FIG. 5, in accordance with an aspect of the present disclosure.
Figure 8:
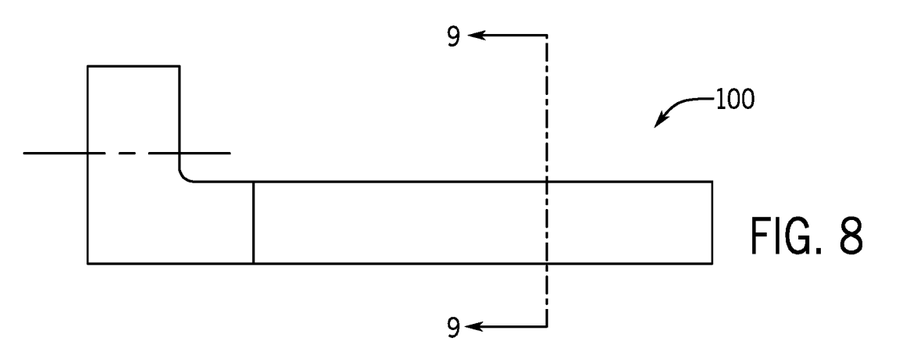
FIG. 8 is a side elevation view of an embodiment of the damping component of FIG. 5, in accordance with an aspect of the present disclosure.
Figure 9:
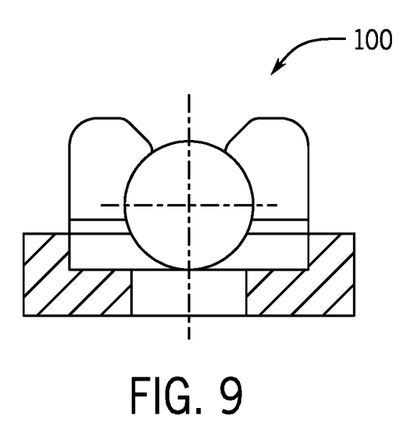
FIG. 9 is a cross section of an embodiment of the damping component of FIG. 5, in accordance with an aspect of the present disclosure.
Figure 10:
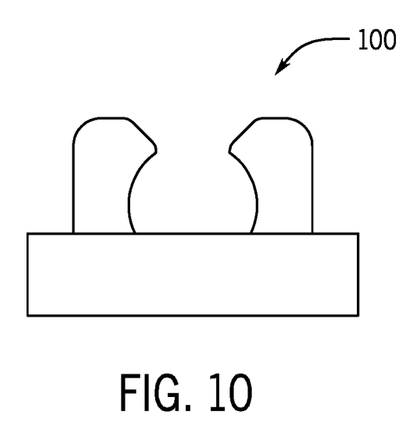
FIG. 10 is a front elevation view of an embodiment of the damping component of FIG. 5, in accordance with an aspect of the present disclosure.

FIG. 5 is a perspective view of an embodiment of the damping device 100 that may be disposed between the portion of the fan guard and the surface of the housing. As shown in the illustrated embodiment of FIG. 5, the damping device 100 includes a clip portion 102 and an attachment portion 104. The clip portion 102 has prongs 106 that are configured to receive a portion of the fan guard, such as a cylindrical wire, and secure the clip portion 102 to the fan guard. In some embodiments, disposing the portion of the fan guard into the prongs 106 secures the damping device 100 to the fan guard via a friction fit. The clip portion 102 includes two of the prongs 106 that are configured to at least partially surround the portion of the fan guard. For instance, each of the prongs 106 include a curved surface 108 that is configured to conform to a shape of the portion of the fan guard and secure the damping device 100 to the fan guard. Further, each of the prongs 106 include a tapered surface 110 configured to facilitate insertion of the portion of the fan guard into the clip portion 104. The tapered surfaces 110 of the prongs 106 reduce a resistance for inserting the portion of the fan guard into the prongs 106 of the clip portion 104. The curved surface 108 secures the portion of the fan guard in the clip portion 104 by blocking movement of the portion of the fan guard with respect to the prongs 106.

Additionally, the attachment portion 104 of the damping device 100 is configured to receive a coupling portion of the fan guard. As shown in the illustrated embodiment of FIG. 5, the attachment portion 104 includes a groove 112 that receives the coupling portion of the fan guard. In other words, a recessed surface 114 of the attachment portion 104 is configured to contact a corresponding surface of the coupling portion of the fan guard. The groove 112 also forms a wall 116 configured to surround an external perimeter of the coupling portion of the fan guard, such that the coupling portion of the fan guard is disposed within the groove 112, as shown in FIGS. 11-14.

Further, the attachment portion 104 includes a slot 118 extending through the recessed surface 114. The slot 118 is configured to receive a fastener that secures the coupling portion of the fan guard to the surface of the housing of the HVAC system. For example, the fastener extends through an opening of the coupling portion of the fan guard, through the slot 118 of the damping device 100, and into an opening of the surface of the housing to secure the fan guard, the damping device, and the housing to one another. In some embodiments, the slot 118 includes a length 120, such that the slot 118 includes an elliptical shape instead of a circular shape. The length 120 of the slot 118 is configured to provide flexibility with variations in sizes and/or shapes of the coupling portion of the fan guard, variations in positions of openings in the coupling portion of the fan guard, and/or variations in positions of openings in the surface of the housing. Such variations may be due to engineering and/or manufacturing tolerances. In any case, the slot 118 enables the damping device 100 to accommodate fan guards that include coupling portions with variations in size, shape, and/or positions of openings as well as housings that include openings with varying positions.

In some embodiments, the attachment portion 104 includes an elliptical shape that is configured to conform to a shape of the coupling portion of the fan guard. In other embodiments, the attachment portion 104 may include another suitable shape that is configured to receive the coupling portion of the fan guard in the groove 112. Further, the attachment portion 104 includes a length 122 that is configured to provide flexibility with variations in sizes and shapes of the coupling portion and/or positions of openings in the housing, which may be caused by manufacturing and/or engineering tolerances. Therefore, the length 122 of the attachment portion 104 may be longer than a length of the coupling portion of the fan guard.

In some embodiments, the damping device 100 may include a resilient or elastic material that absorbs vibrations moving through the fan guard. For instance, in some embodiments, the housing of the HVAC system may include a fan and/or a motor that drives movement of the fan. Movement of the fan and/or movement of the motor may cause the fan guard to vibrate. Accordingly, the damping device 100 is disposed between the fan guard and the housing to reduce vibrational energy transferred between the fan guard and the housing, thereby reducing noise generated by the HVAC system. The resilient or elastic material may include rubber, foam, a polymeric material, another suitable resilient or elastic material, or any combination thereof. FIGS. 6-10 further illustrate various views of the damping device 100 of FIG. 5.

Figure 11:
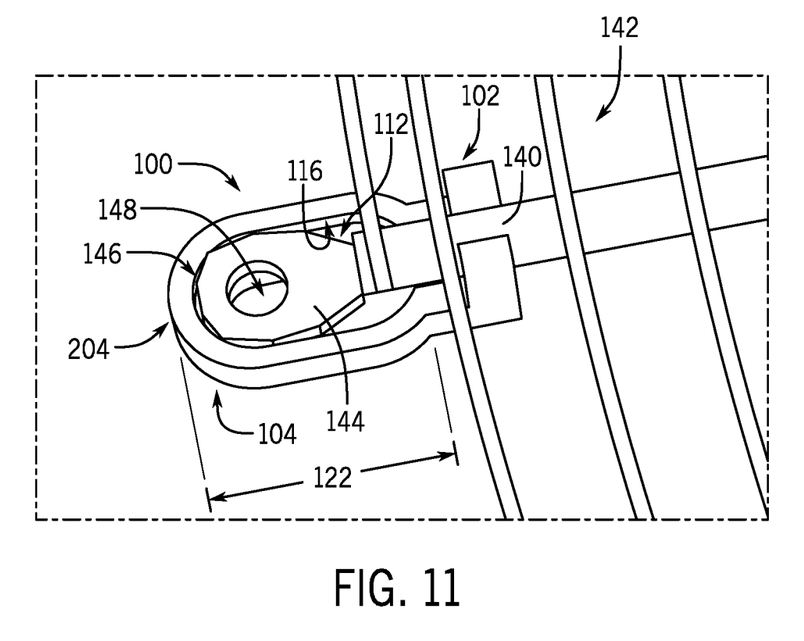
FIG. 11 is a perspective view of an embodiment of the damping component of FIG. 5 coupled to a fan guard, in accordance with an aspect of the present disclosure.

FIG. 11 is perspective view of the damping device 100 coupled to a portion 140 of a fan guard 142, where the portion 140 of the fan guard 142 includes a substantially cylindrical wire. Further, a coupling portion 144 of the fan guard 142 is disposed within the groove 112 of the damping device 100. As shown in the illustrated embodiment of FIG. 11, the coupling portion 144 of the fan guard 142 abuts a portion 146 of the wall 116 that is furthest from the clip portion 102 along the length 122 of the attachment portion 104. Accordingly, an opening 148 extending through the coupling portion 144 is aligned with slot 118 at a position that is furthest from the clip portion 102 along the length of the attachment portion 104. As shown in the illustrated embodiment of FIG. 11, the opening 148 is generally circular in shape. In other embodiments, the opening 148 may be square shaped, elliptical, polygonal, or any other suitable shape that is configured to receive a fastener.

Figure 12:
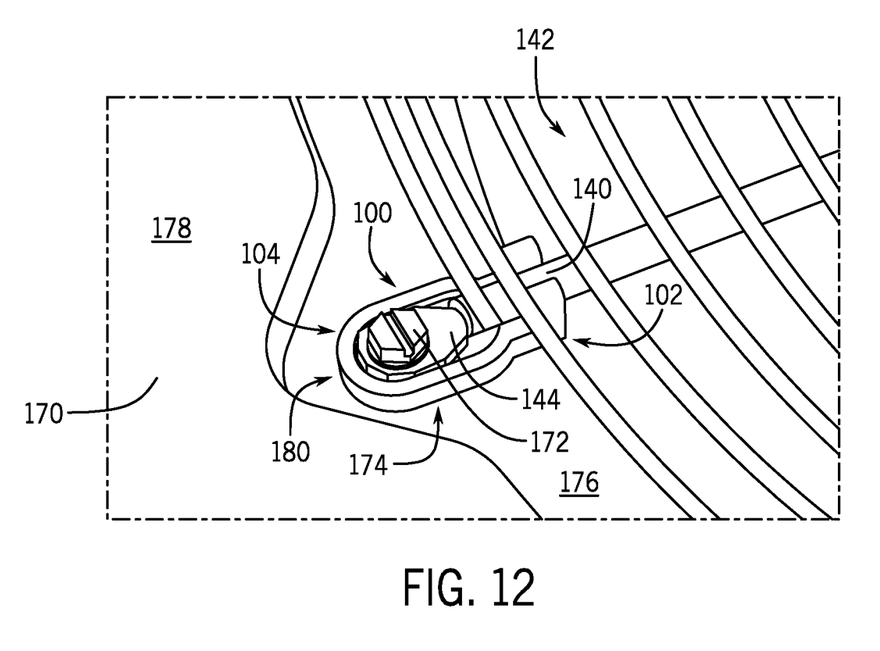
FIG. 12 is a perspective view of the damping component of FIG. 11 and the fan guard coupled to a housing, in accordance with an aspect of the present disclosure.

FIG. 12 is a perspective view of the fan guard 142 and the damping device 100 coupled to a housing 170 of the HVAC system. A fastener 172 extends through the opening 148 of the coupling portion 144 of the fan guard 142, through the slot 118 of the damping device 100, and into a corresponding opening 174 disposed in a surface 176 of the housing 170. In some embodiments, the fastener 172 includes a threaded fastener, such as a screw or a bolt. In other embodiments, the fastener 172 includes a locking pin or other suitable device that is configured to secure the fan guard 142, the damping device 100, and the housing 170 to one another.

In some embodiments, the surface 176 of the housing 170 is recessed from a top surface 178. As such, the fan guard 142 and the top surface 178 may be substantially flush with one another. Further, the surface 176 may include an extension 180 that is configured to extend the surface 176 at the opening 174 and provide additional space for the coupling portion 144 and/or the damping device 100. Additionally or alternatively, the extension 180 may provide a visual indicator to an installer of the HVAC system as to a location where the opening 174 is positioned on the surface 176 of the housing 170.

Figure 13:
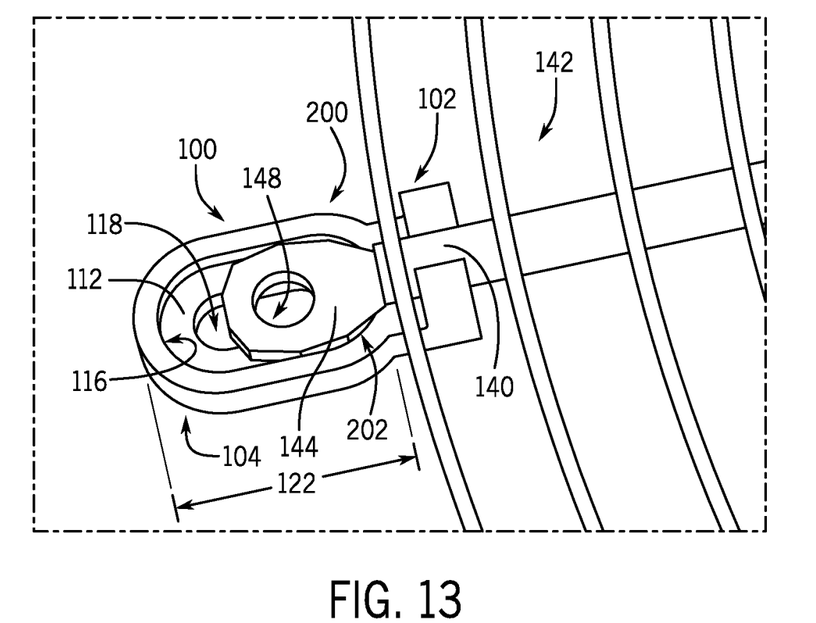
FIG. 13 is a perspective view of an embodiment of the damping component of FIG. 5 coupled to the fan guard, in accordance with an aspect of the present disclosure.
Figure 14:
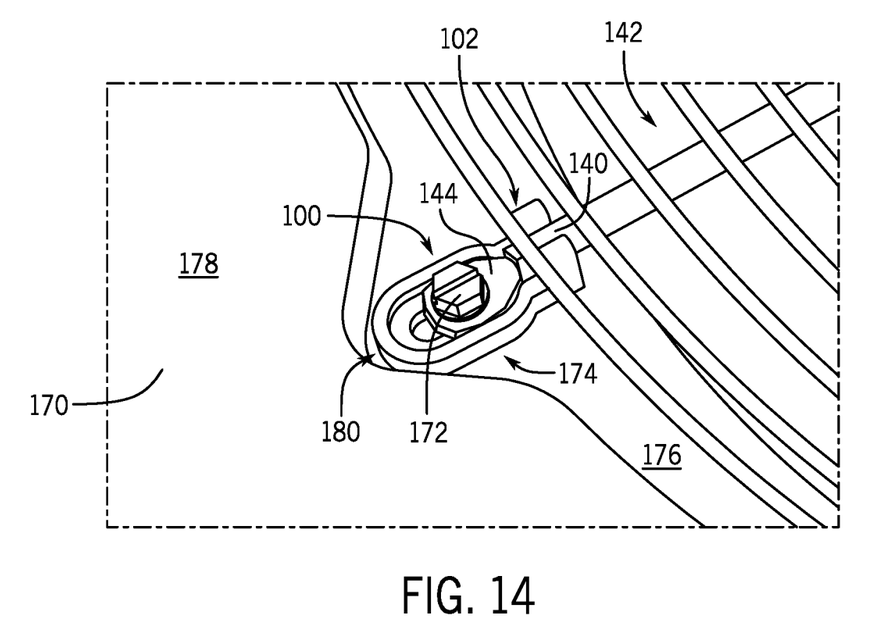
FIG. 14 is a perspective view of the damping component of FIG. 13 and the fan guard coupled to a housing, in accordance with an aspect of the present disclosure.

As discussed above, the slot 118 is configured to provide flexibility for variations in sizes and shapes of the coupling portion 144, a position of the opening 148, and/or a position of the opening 174 along the surface 176. For example, FIGS. 13 and 14 illustrate perspective views of the coupling portion 144 of the fan guard 142 at a second position 200 within the damping device 100. As shown in the illustrated embodiments of FIGS. 13 and 14, the coupling portion 144 abuts a portion 202 of the wall 116 nearest to the clip portion 102 of the damping device 100 along the length 122 of the attachment portion 104. Accordingly, the opening 148 extending through the coupling portion 144 is aligned with slot 118 at a position that is closest to the clip portion 102 along the length 122 of the attachment portion 104. It should be understood that the coupling portion 144 may be disposed within the groove 112 of the damping device 100 at any position between a first position 204 shown in FIG. 11 and the second position 202 shown in FIG. 13. The fastener 172 may then be disposed into the opening 148, the slot 118, and the opening 174 to secure the fan guard 142, the damping device 100, and the housing 170 to one another.

In some embodiments, the extension 180 provides additional flexibility for variances in the sizes and shapes of the coupling portion 144, a position of the opening 148, and/or a position of the opening 174 along the surface 176. As shown in the illustrated embodiment of FIG. 14 the extension 180 extends the surface 176 and provides additional space for the damping device 100 when the coupling portion 144 is in the second position 202.

Figure 15:
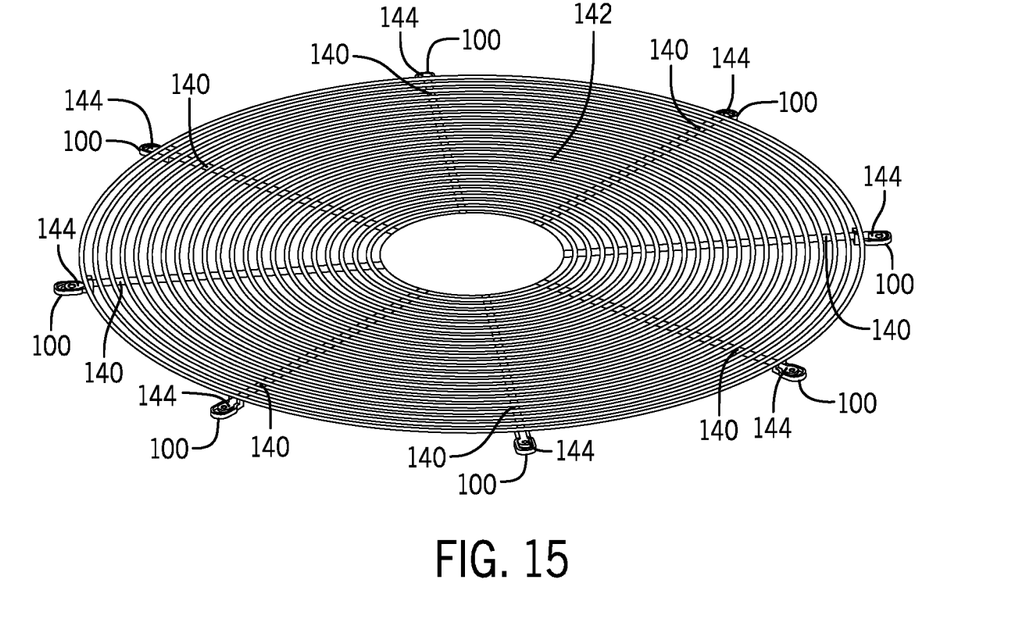
FIG. 15 is a perspective view of a plurality of damping components coupled to corresponding coupling portions of the fan guard, in accordance with an aspect of the present disclosure.

FIG. 15 is a perspective view of an embodiment of the fan guard 142 with a plurality of the damping devices 100 coupled to a plurality of the portions 140 of the fan guard 142 via the clip portion 102. As such, the damping devices 100 may be secured to the fan guard 142 before the fan guard 142 is secured to the housing 170, thereby facilitating installation of the fan guard 142 and the damping devices 100. While the illustrated embodiment of FIG. 15 shows that the fan guard 142 includes eight of the portions 140 and eight corresponding damping devices 100, it should be recognized that the fan guard 142 may include one, two, three, four, five, six, seven, nine, ten, or more than ten of the portions 140 and corresponding damping devices 100.

Figure 16:
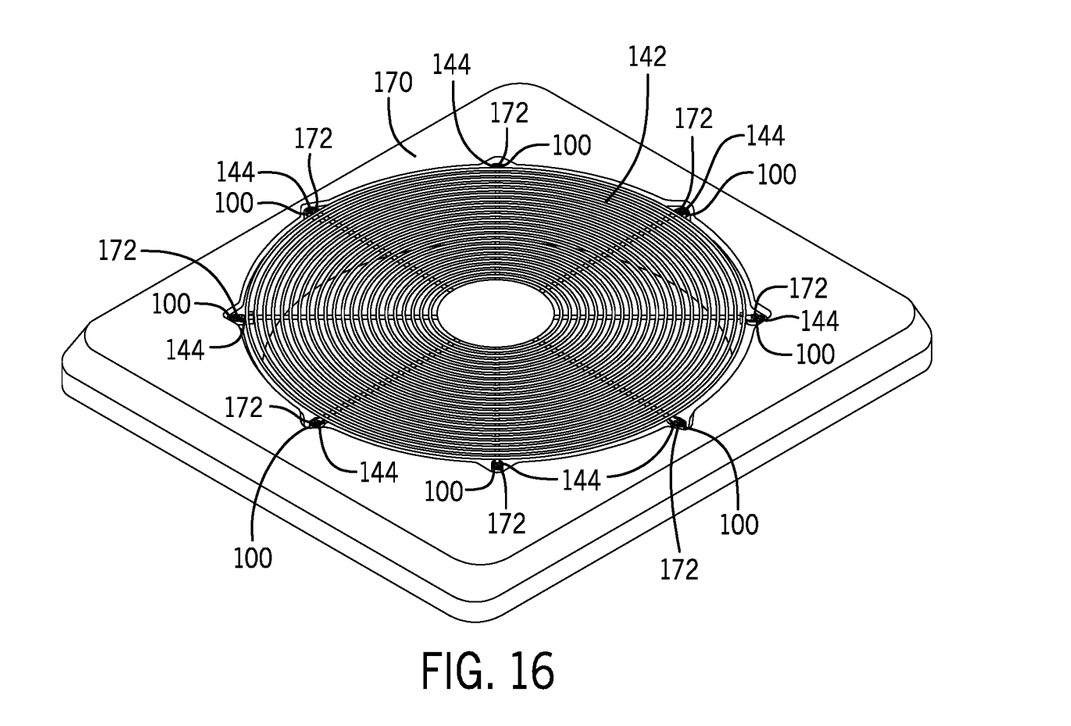
FIG. 16 is a perspective view of the plurality of damping components of FIG. 15 coupled to the corresponding coupling portions of the fan guard and coupled to a housing, in accordance with an aspect of the present disclosure.

FIG. 16 is a perspective view of the fan guard 142 and the damping devices 100 of FIG. 15 coupled to the housing 170 via a plurality of the fasteners 172. Accordingly, a respective fastener 172 extends through the opening 148 of each of the plurality of coupling portions 144 of the fan guard 142, through each slot 118 of the plurality of damping devices 100, and through a corresponding opening 174 of the surface 176 of the housing 170 to secure the fan guard 142 and/or the damping devices 100 to the housing 170.

Figure 17:
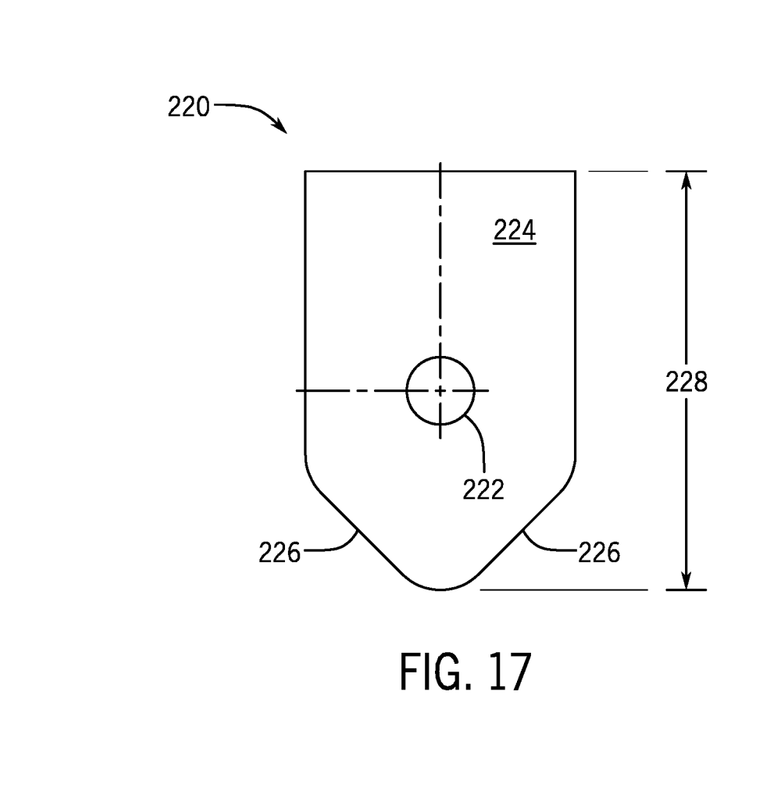
FIG. 17 is a plan view of an embodiment of the damping component, in accordance with an aspect of the present disclosure.

FIG. 17 is a plan view of an embodiment of a damping device 220 that may be disposed over the opening 174 of the housing 170. For instance, the damping device 220 includes an aperture 222 that is configured to be aligned with the opening 174 of the housing 170 and the opening 148 of the coupling portion 144 of the fan guard 142. The damping device 220 may be secured to the surface 176 of the housing 170 via an adhesive, such as epoxy, glue, a cyanoacrylate, another suitable adhesive, or any combination thereof. In some embodiments, the adhesive is applied to a surface 224 of the damping device 220 before application of the damping device 220 to the surface 176 of the housing 170. Further, the damping device 220 may include a cover, such as backing paper, that is disposed over the adhesive and may be peeled from the surface 224 of the damping device 220 prior to the application of the damping device 220 onto the surface 176. In other embodiments, the damping device 220 may be secured to the surface 176 of the housing 176 using a fastener or another suitable coupling technique.

In some embodiments, the damping device 220 includes tapered surfaces 226 that are configured to conform to a shape of the coupling portion 144 of the fan guard 142. Further, the tapered surfaces 226 may reduce an amount of material that is utilized to form the damping device 220. In some embodiments, the damping device 220 includes a length 228 that that is greater than a length of the coupling portion 144 of the fan guard 142. Accordingly, the damping device 220 may be configured to provide flexibility for variability in sizes of the coupling portion and/or positions of the openings 148 and 174 of the coupling portion and/or the housing 170.

Figure 18:
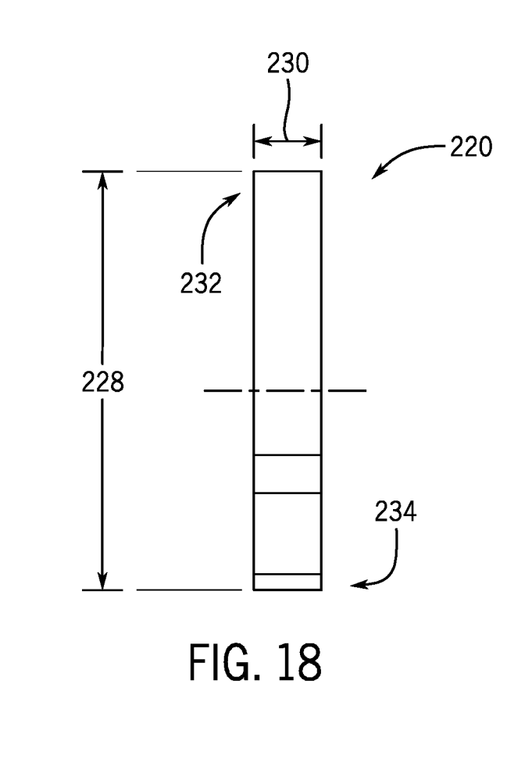
FIG. 18 is an elevation view of the damping component of FIG. 15, in accordance with an aspect of the present disclosure.

FIG. 18 is a side elevation view of an embodiment of the damping device 220. As shown in the illustrated embodiment of FIG. 18, the damping device 220 includes a thickness 230. In some embodiments, the thickness 230 is substantially constant throughout the length 228 of the damping device 220. In other embodiments, the thickness 230 may decrease along the length 228 from a first end 232 of the damping device 220 to a second end 234 of the damping device 220. In still further embodiments, the thickness 230 may decrease along the length 228 from the second end 234 to the first end 232. In any case, the thickness 230 of the damping device 220 is configured to absorb vibrational energy from the fan guard 142 and/or the housing 170 and reduce a transfer of the vibrational energy between the fan guard 142 and the housing 170, thereby reducing noise generated by the HVAC system.

In some embodiments, the damping device 220 may include a resilient or elastic material that absorbs vibrational energy of the fan guard 142 and/or the housing 170. For instance, in some embodiments, the housing 170 of the HVAC system may be configured to receive a fan and/or a motor that drives movement of the fan. Movement of the fan and/or movement of the motor may cause the fan guard 142 to vibrate. Accordingly, the damping device 220 is disposed between the fan guard 142 and the housing 170 to reduce vibrational energy transferred between the fan guard 142 and the housing 170, thereby reducing noise generated by the HVAC system. The resilient or elastic material may include rubber, foam, a polymeric material, another suitable resilient or elastic material, or any combination thereof.

As set forth above, embodiments of the present disclosure may provide one or more technical effects useful in operation of HVAC systems. For example, a damping device is disposed between a fan guard and a housing of the HVAC system to reduce transfer of vibrational energy between the fan guard and the housing, thereby reducing an amount of noise generated by the HVAC system. In some embodiments, the damping device includes a clip portion that enables the damping device to be secured to the fan guard before coupling the fan guard to the housing. In other embodiments, the damping device may be applied to a surface of the housing before the fan guard is coupled to the housing. In any case, vibrational energy transferred between the fan guard and the housing is reduced, which reduces noise generated by the HVAC system. The technical effects and technical problems in the specification are examples and are not limiting. It should be noted that the embodiments described in the specification may have other technical effects and can solve other technical problems.

While only certain features and embodiments have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:
1. A heating, ventilation, and air conditioning (HVAC) system, comprising:
a housing configured to extend about and receive a motor of the HVAC system;
a fan guard comprising an array of cylindrical wires, the fan guard coupled to a surface of the housing via a plurality of coupling portions each coupling portion of the plurality of coupling portions extending from a respective cylindrical wire of the array of cylindrical wires; and
a plurality of damping devices disposed between the fan guard and the surface of the housing, wherein the plurality of damping devices is disposed against the surface of the housing, and the plurality of damping devices is configured to absorb vibrational energy generated by the HVAC system,
wherein each damping device of the plurality of damping devices comprises a clip having a body portion and opposing prongs extending therefrom that secure the damping device to a respective cylindrical wire of the array of cylindrical wires, a groove within the body portion defined by a peripheral wall surrounding a recessed surface therein, and a slot formed in and extending through the recessed surface,
wherein each coupling portion of the plurality of coupling portions is disposed within the groove of the damping device secured to the respective cylindrical wire from which the coupling portion extends, such that the peripheral wall surrounds an external perimeter of the coupling portion and the recessed surface abuts the coupling portion, and wherein the slot is aligned with an opening formed in and extending through the coupling portion such that the slot and the opening are configured to receive a fastener therethrough to secure the fan guard and the damping device to the surface of the housing.

2. The system of claim 1, wherein the slot is offset from the opening along an axis extending through the slot and the opening.

3. The system of claim 2, wherein the slot comprises a length greater than a width of the opening.

4. The system of claim 1, wherein the damping device comprises rubber, or foam, or a combination thereof.

5. The system of claim 1, wherein the damping device comprises an adhesive configured to couple the damping device to the surface of the housing.

6. The system of claim 5, wherein the damping device comprises a tapered portion configured to conform to a shape of the coupling portion.

7. The system of claim 1, wherein each prong comprises a curved surface configured to conform to a shape of the respective cylindrical wire.

8. A heating, ventilation, and air conditioning (HVAC) system, comprising:
- a housing;
- a fan disposed within the housing;
- a motor coupled to the fan and disposed within the housing, wherein the motor is configured to drive rotation of the fan;
- a fan guard comprising an array of cylindrical wires, the fan guard coupled to a surface of the housing via a plurality of coupling portions each coupling portion of the plurality of coupling portions extending from a respective cylindrical wire of the array of cylindrical wires;
- a plurality of damping devices disposed between the fan guard and the surface of the housing, wherein the plurality of damping devices is configured to absorb vibrational energy caused by the motor, and the plurality of damping devices is disposed against the surface of the housing,
- wherein each damping device of the plurality of damping devices comprises a clip having a body portion and opposing prongs extending therefrom that secure the damping device to a respective cylindrical wire of the array of cylindrical wires, a groove within the body portion defined by a peripheral wall surrounding a recessed surface wherein, and a slot formed in and extending through the recessed surface,
- wherein each coupling portion of the plurality of coupling portions is disposed within the groove of the damping device secured to the respective cylindrical wire from which the coupling portion extends, such that the peripheral wall surrounds an external perimeter of the coupling portion and the recessed surface abuts the coupling portion, and
- wherein the slot is aligned with an opening formed in and extending through the coupling portion; and
- a respective fastener extending through each opening and corresponding slot to secure the fan guard and the plurality of damping devices to the surface of the housing.

9. The system of claim 8, wherein the slot comprises a length greater than a width of the opening.

* * * * *